United States Patent [19]
Woodbury

[11] 4,228,879
[45] Oct. 21, 1980

[54] TRACTOR TRANSMISSION SHIFT CONTROL

[75] Inventor: Larry A. Woodbury, Cedar Falls, Iowa

[73] Assignee: Deere & Company, Moline, Ill.

[21] Appl. No.: 946,498

[22] Filed: Sep. 28, 1978

[51] Int. Cl.³ .............................................. G05G 5/10
[52] U.S. Cl. .................................... 192/4 A; 74/475; 74/476; 74/477
[58] Field of Search .................... 74/473 R, 476, 475, 74/477; 192/4

[56] References Cited

U.S. PATENT DOCUMENTS

| | | | |
|---|---|---|---|
| 2,772,652 | 12/1956 | Shane et al. | 74/477 X |
| 2,775,134 | 12/1956 | Swenson | 74/477 X |
| 3,242,758 | 3/1966 | Harris et al. | 74/476 |
| 3,566,711 | 3/1971 | Leuenberger | 74/477 X |
| 3,774,475 | 11/1973 | Meysenburg | 74/477 X |
| 3,800,924 | 4/1974 | Hansen | 192/4 A |

*Primary Examiner*—Allan D. Herrmann

[57] ABSTRACT

A shift control for a hydromechanical transmission includes a support member having a primary pivot pin carrying side-by-side longitudinally exending range and speed shift quadrants respectively connectible to the transmission to change ranges and speeds. A shift mechanism with a vertically extending shift lever pivots laterally on a main pivot member which is pivotable around the primary pivot pin to allow longitudinal pivotal movement of the shift lever. A guide plate contains a shift pattern cutout in which the shift lever is laterally movable from a neutral position in which latches in the shift lever mechanism prevent both quadrants from moving to a range or speed shift quadrant engaged position where one of the latches respectively releases the range or speed shift quadrant to allow pivotation thereof upon longitudinal movement of the shift lever. The shift pattern cutout is provided with stop cutouts to require a Z shifting pattern to shift between ranges in one direction of longitudinal movement and the shift lever mechanism cooperates with the support member to require the same Z pattern in the opposite direction of longitudinal pivotation. The shift pattern cutout further requires that the speed shift quadrant be in the neutral position for engagement with the shift lever. A high/low lever pivotable by lateral movement of the shift lever mechanism along with longitudinal movement of the shift lever to cause pivotation of the speed shift quadrant provides additional speed shifting. Lockout devices utilizing a cam follower mechanism and a lever arm mechanism operating off the range shift quadrant respectively prevent reverse operation and of certain speeds in predetermined ranges.

30 Claims, 7 Drawing Figures

TRACTOR TRANSMISSION SHIFT CONTROL

BACKGROUND OF THE INVENTION

The present invention relates generally to transmission shift controls and more particularly to a single lever control which operates range shift, two types of speed shift, two types of selected speed lockout, and parking lockup.

In the past, generally two levers were used to control range and speed shifting and, in addition to being difficult to operate, it was possible to shift through incorrect sequences so as to damage the transmission, i.e. shifting ranges without shifting the speed shift to neutral.

SUMMARY OF THE INVENTION

The present invention provides a simple, multi-function, hydromechanical transmission shift control which allows single lever control of the range shift, speed shift, and the high/low speed shift while providing automatic lockout of reverse operation in predetermined ranges, lockout of operation at predetermined speeds, and positive parking lockup.

The above and additional advantages of the present invention will become apparent to those skilled in the art from a reading of the following detailed description when taken in conjunction with the accompanying drawings.

DESCRIPTION OF THE PREFERRED EMBODIMENT

Figure 1:
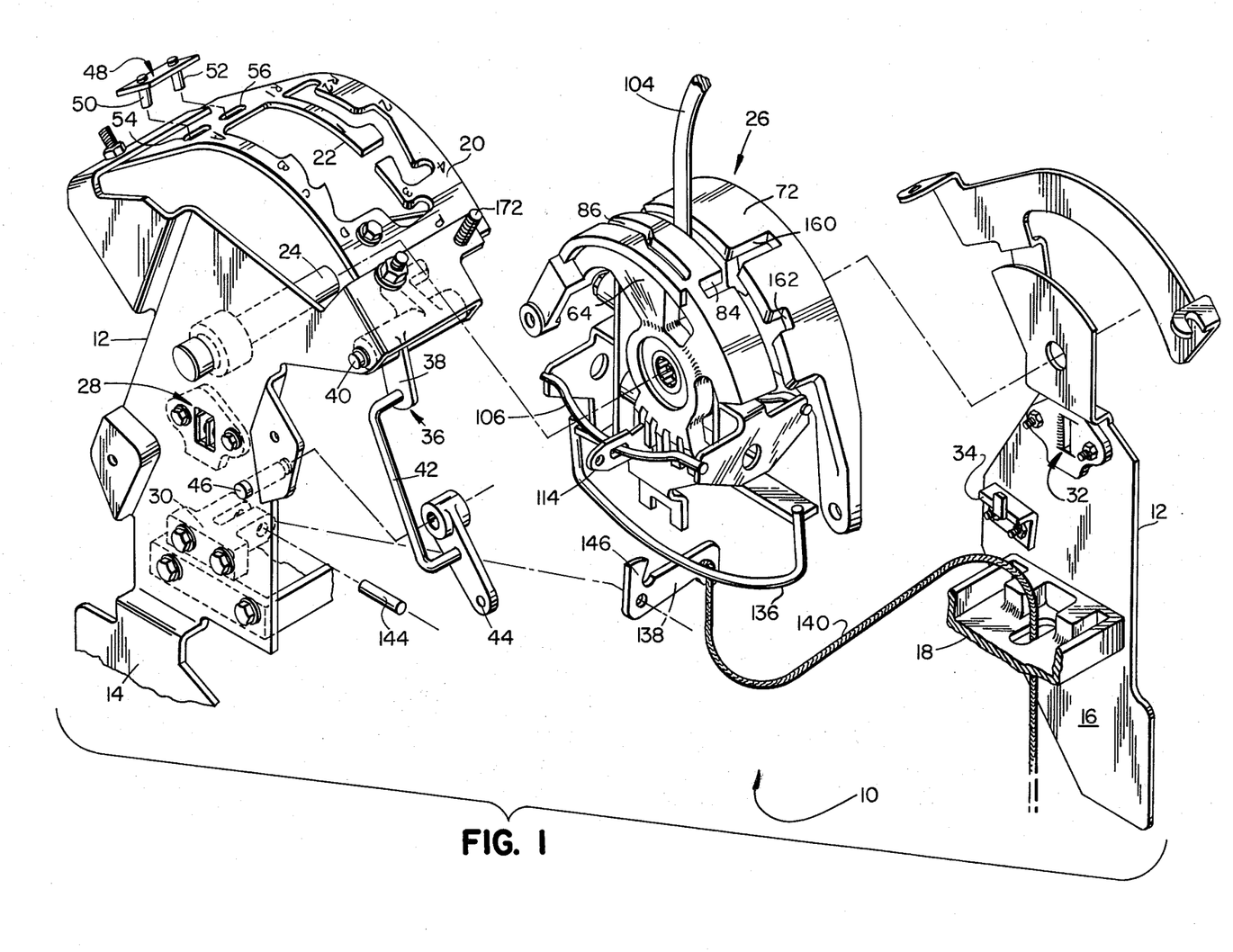
FIG. 1 is an exploded isometric view of the present invention.

Referring now to FIG. 1, therein is shown a tractor transmission shift control 10 for controlling a hydromechanical transmission of the type disclosed in the U.S. Pat. No. 3,774,475 granted to R. R. Meysenburg, the disclosure of which is incorporated herein by reference thereto. Briefly, the Meysenburg transmission utilizes a synchronizer pack speed change mechanism to control the configuration of a first set of gears, a high/low change hydraulic valve to control the configuration of a second set of gears which provide a direct or an underdrive to the transmission, and collar shift range change mechanism to control the configuration of a third set of transmission gears to the final output.

Figure 2:
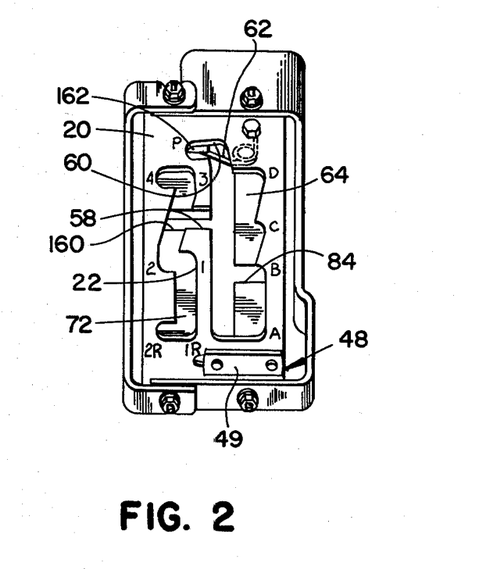
FIG. 2 is a top view of an assembly of the present invention with some parts omitted for clarity.

The shift control 10 includes a support member 12 which consists of a pair of longitudinally extending side plates 14 and 16 joined by a cross member 18 and a guide plate 20 which may best be seen by reference to FIG. 2. The guide plate 20 has a shift pattern cutout 22 provided therein which will be described in more detail later.

Returning to FIG. 1, it may be seen that the support member 12 carries a laterally extending primary pivot pin 24 on which a pivoting assembly 26 is mounted. The support member 12 further carries a range shift latch pivot 28 and a high/low pivot 30 on the side plate 14. The side plate 16 carries a speed shift latch pivot 32 and a range stop finger 34. The support member 12 may further be seen to carry a park lockup mechanism 36 which consists of a park arm 38 pivoted on a park pin 40, a rod 42, and a park lockup connection 44 pivoted on a park pivot pin 46. The guide plate 20 carries a reverse lockout mechanism 48, to prevent high reverse speeds, which includes pins 50 and 52 respectively disposed in slots 54 and 56 in the guide plate 20.

Referring now to FIG. 2, therein is shown the guide plate 20 with the shift pattern cutout 22 which includes a neutral cutout 58 and a park cutout 60. The various portions of the shift pattern cutout 22 which define the various range and speed shift positions are designated by the letters "A," "B," "C," and "D" which are the range stops and "1," "2," "3," "4," "1R," and "2R" which are the speed stops for the four forward and two reverse speeds. The letter "P" designates the park stop. Also best seen in FIG. 2 is the pin bracket 49 which carries the pins 50 and 52 of the reverse lockout mechanism 48. Also shown disposed across the park cutout 60 is a parking spring 62.

Figure 3:
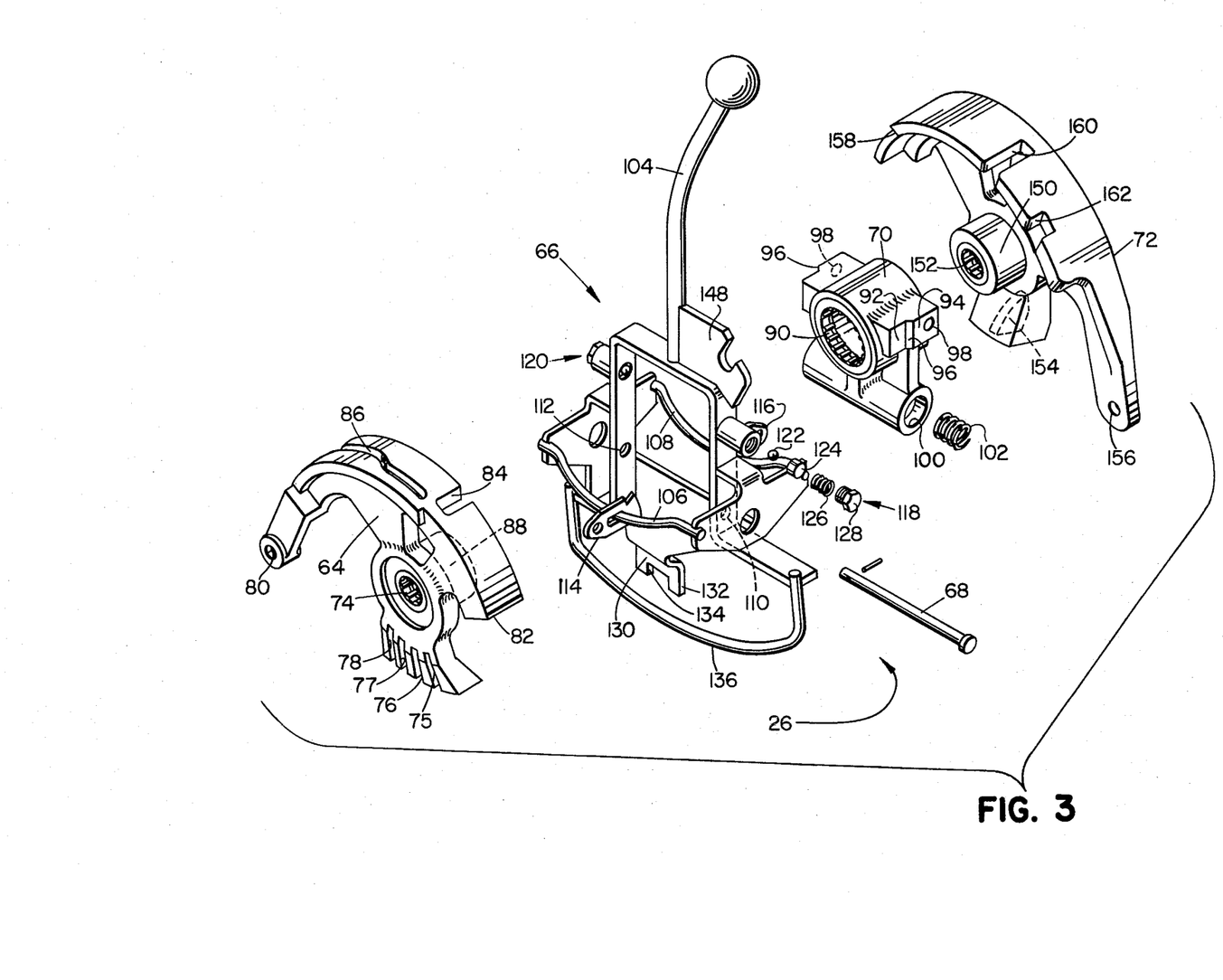
FIG. 3 is an exploded isometric view of a portion of the present invention shown in FIG. 1.

Referring now to FIG. 3, therein is shown the pivoting assembly 26 which is made up of five main assemblies: a range shift quadrant 64, a shift lever mechanism 66, a secondary pin 68, a main pivot member 70, and a speed shift quadrant 72.

The range shift quadrant 64 is provided with quadrant bearings 74 by which it pivots on the primary pivot pin 24. Below the quadrant bearings 74 are four holding slots 75 through 78 and above the quadrant bearing is a curved portion which contains at one end a collar shift range change mechanism connection 80 and at the other contains a face 82. Between the two ends is provided a shift lever slot 84 and a reverse lockout cam groove 86. The range shift quadrant 64 is provided with a boss which has a main bearing surface 88 provided thereon.

The main bearing surface 88 carries one of a pair of main bearings 90 (only one shown) by which the main pivot member 70 pivots around the primary pivot pin 24. The main pivot member 70 has two pairs of opposed range and speed flats 92 and 94 which are respectively connected by ramps 96 with the range flats 92 closer spaced than the speed flats 94. Each of the opposed speed flats 94 carry drilled countersinks 98 which are slightly offset from one another in the lateral direction as will later be explained.

The main pivot member 70 is provided with a secondary pivot bore 100 which contains a spring 102 and which pivotally carries the secondary pivot pin 68. The secondary pivot pin 68 carries the shift lever mechanism 66.

The shift lever mechanism 66 has a shift lever 104 extending vertically from the top and has arcuate range and speed bars 106 and 108 disposed to either side of secondary pin bores 110 and 112. The range and speed bars 106 and 108 respectively carry range and speed latches 114 and 116 which have a sliding fit thereon. The range and speed latches 114 and 116 are pivotally secured in the range and speed shift latch pivots 28 and 32 on the support member 12.

Between the range and speed bars 106 and 108 and the shift lever 104 are a pair of detents 118 and 120 which are intended to engage the range and speed flats 92 and 94. Each detent is made up of a ball 122 backed by an anti-friction plug 124 and a spring 126 which is held in place by a cap 128.

Below the secondary pin bores 110 is a range stop bracket 130 which has a pair of fingers 132 and 134 which are intended to engage the range stop finger 34 on the support member 12. Disposed below the range stop bracket 130 is a high/low actuator bar 136 which constantly abuts a high/low lever 138 which may best be seen by reference to FIG. 4.

Figure 4:
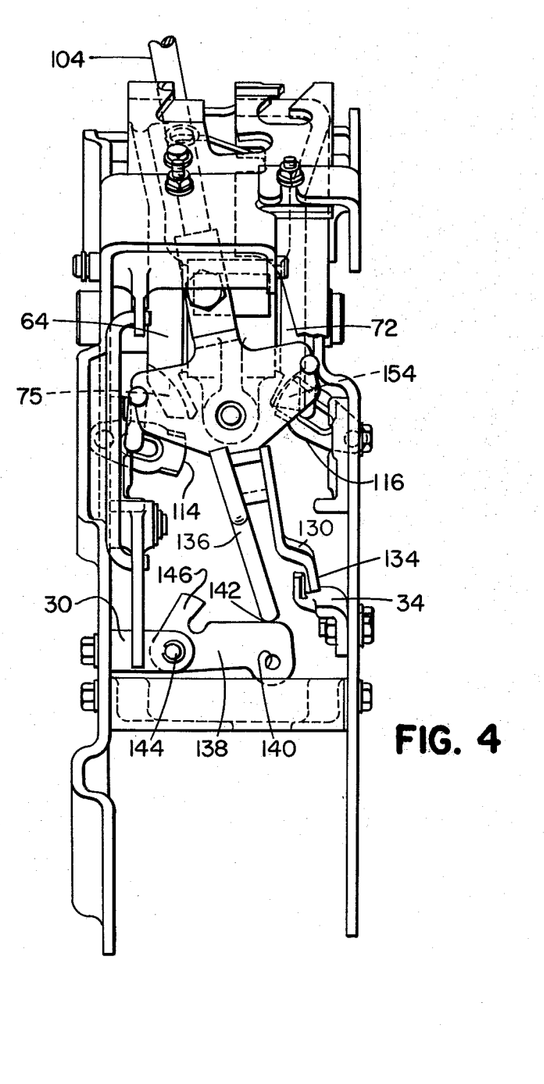
FIG. 4 is a front view of the present invention with some parts omitted for clarity.

The high/low lever 138 contains a high/low change hydraulic valving connection 140 at one end beneath a high/low lever surface 142 against which the high/low actuator bar 136 abuts. The high/low lever 138 is pivotable about a high/low pin 144 which is disposed in the high/low pivot 30 on the support member 12. The high/low lever 138 further has an upright portion 146 which is abutted by the high/low actuator bar 136 in order to cause pivotation of the high/low lever 138.

Referring back to FIG. 3, therein is shown the park lockup bracket 148 which is disposed longitudinally in front of the shift lever 104.

Referring now to the main pivot member 70, the other of the main bearings 90 pivots on a main bearing surface 150 of the speed shift quadrant 72. The speed shift quadrant 72 itself is carried by quadrant bearings 152 on the primary pivot pin 24. The bottom of the speed shift quadrant 72 is provided with a single holding slot 154 and the top portion is curved with the synchronizer pack speed change mechanism connection 156 at one end and a reverse lockout notch 158 provided at the other end. Between the two ends, there is provided a shift lever slot 160 and a parking lockup notch 162.

Figure 5:
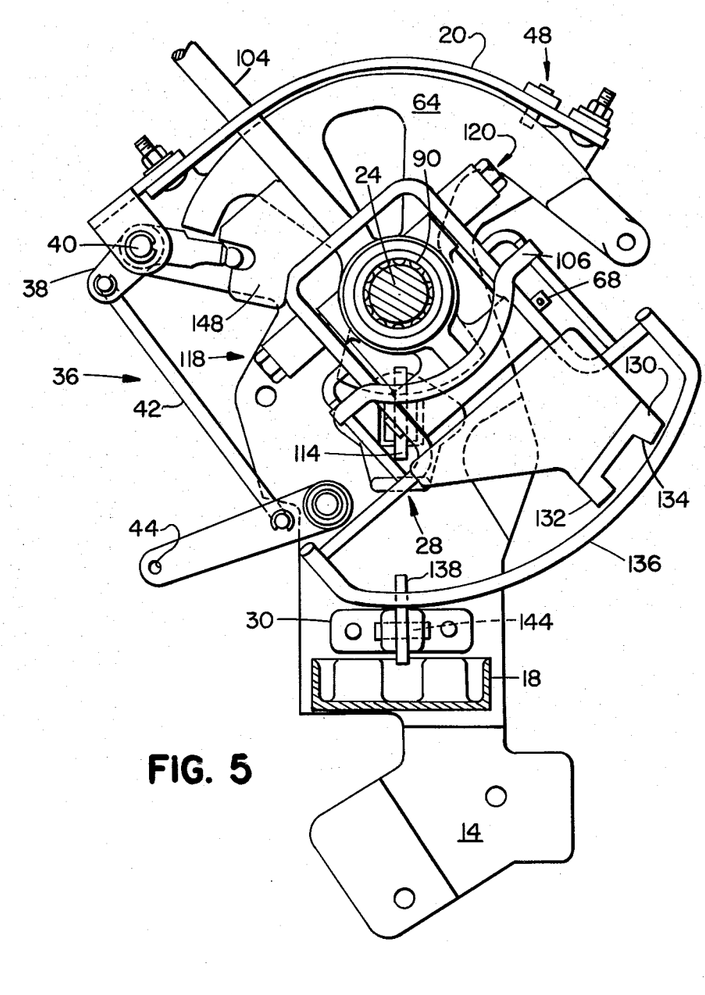
FIG. 5 is a side view of the present invention with some parts omitted for clarity.

Referring now to FIG. 5, therein is shown the park lockup mechanism 36 in its engaged position with the park lockup bracket 148 abutting the park arm 38 to cause lifting of the park lockup connection 44 for locking up the transmission.

Figure 6:
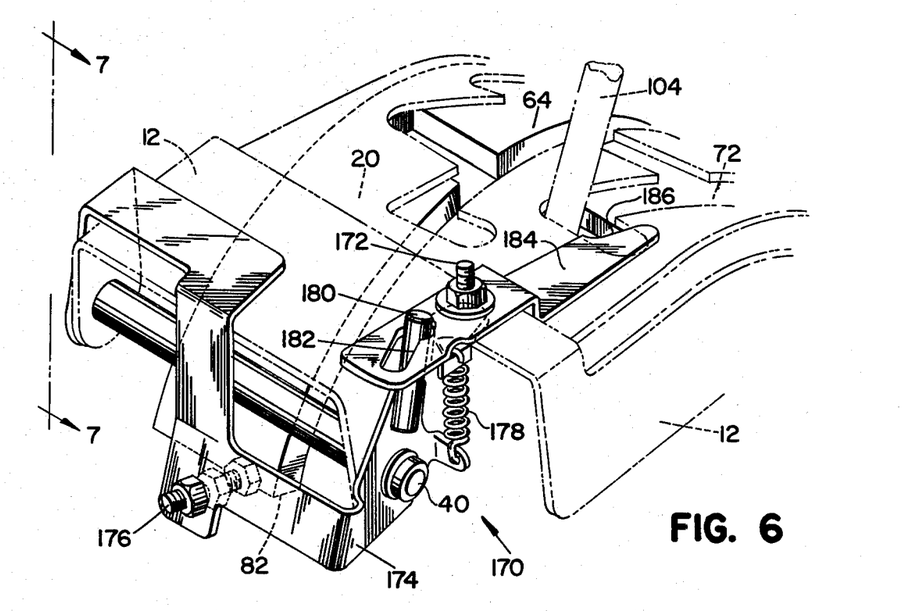
FIG. 6 is an isometric view of an additional portion of the present invention.

Referring now to FIG. 6, therein is shown a speed limiting lockout device 170 which is normally incorporated in the shift control 10 on tractors being used in some European countries where tractors must be speed limited for on the road travel between fields.

Figure 7:
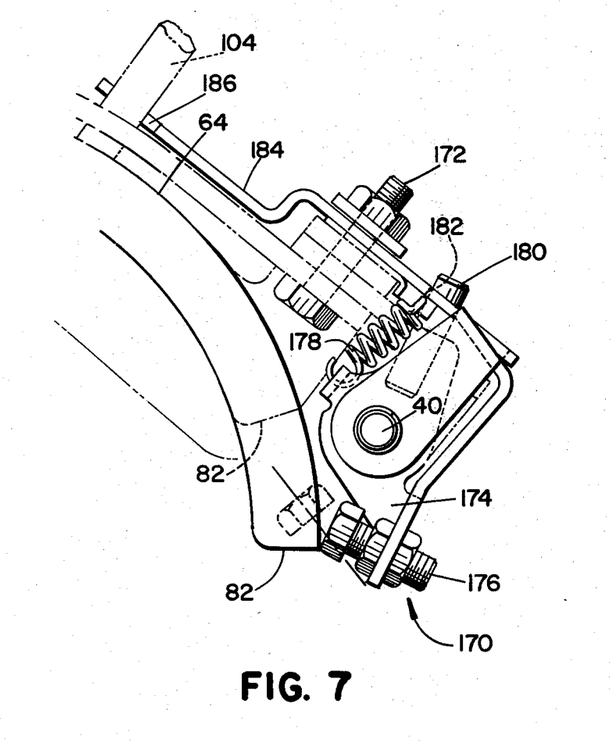
FIG. 7 is a view taken along line 7—7 of FIG. 6.

The speed limiting lockout device 170 is mounted on the park pivot pin 40 and a threaded stud 172 which is one of four studs on the guide plate 20 which secures it to the support member 12 (best seen in FIG. 1). A pivot bracket 174 pivots around the park pivot pin 40 and is provided with an adjustable bolt 176 in such a position that a full movement of the range quadrant 64 will cause an edge of the lockout face 82 to abut the head of the bolt and cause pivotation of the pivot bracket 174 (see FIGS. 6 and 7). Reverse pivotation of the range quadrant 64 allows the pivot bracket 174 to be pivoted in the opposite direction under the urging of a spring 178. The pivot bracket 174 further carries an actuator pin 180 which is welded thereto and which engages a stepped slot 182 in a lockout arm 184. The lockout arm 184 further has a lockout surface 186 which is movable to selectively block a part of the shift pattern cutout 22.

Operation

Starting from a park position, the shift lever 104 is pivoted laterally against the park spring 62, out of the park cutout 60 into a longitudinally extending vertical plane to the position shown in FIG. 1. In this position, the shift lever 104 is free to pivot about the primary pivot pin 24 without affecting the range or shift quadrant 64 or 72 because the arcuate range and speed bars 106 and 108 slide through the respective range and speed latches 114 and 116 which are in engaged positions with one of the holding slots 75 through 78 and the holding slot 154, respectively.

Assuming that the transmission is in the "B" range as shown in FIG. 2, and it is desired to shift the transmission into "A" range which is the lowest of the ranges, the shift lever 104 is pivoted laterally in a generally vertical-lateral plane into engagement with the shift lever slot 84 in the range shift quadrant 64. While this causes the speed latch 116 to pivot into deeper engagement with the holding slot 154, the pivotation of the range bar 106 around the secondary pin 68 causes the range latch 114 to move out of engagement with the holding slot 77. The shift lever 104 is then drawn longitudinally towards the "A" range position so as to cause pivotation of the range shift quadrant 64 and a downward movement of the collar shift range change mechanism connection 80 which shifts the necessary mechanism for the transmission to be placed in the "A" range.

The shift lever 104 is then moved out of the shift lever slot 84 to cause the range shift quadrant to be locked in place by the range latch 114 engaging the holding slot 78. The shift lever 104 is then pivoted to be laterally in line with the neutral cutout 58 in the shift pattern cutout 22. Lateral movement of the shift lever 104 into engagement with the shift lever slot 160 then causes the speed latch 116 to pivot out of engagement with the holding slot 154.

To reach the slower and reverse speeds, the shift lever 104 is pivoted so as to cause the speed change mechanism connection 156 to be lifted. Due to the nature of the transmission, it is shifted first through second speed position "2" and then by a lateral movement of the shift lever 104 into the first speed position "1". In this position, the speed change mechanism connection 156 is in a first speed position when the high/low actuator bar 136 abuts the high/low lever surface 142 to keep the high/low change hydraulic valving 138 in its down, "low" position.

The shift lever 104 is merely moved laterally to the second position "2" for the next faster speed, which causes the high/low actuator bar 136 to pivot laterally and abut the upright 146 of the high/low lever 138 so as to cause the high/low lever 138 to pivot and shift the input to the transmission to "high".

When the shift lever 104 is moved laterally to cause the high/low actuator bar 136 to cause pivotation of the high/low lever 138, positive positions will be felt because of the detents 118 and 120 provided in the shift lever mechanism 66. In the "low" position, the detent 118 engages one of the drilled counter-sink 98 so as to provide a positive position. When shifting from the "low" position, the detent 118 must be pulled out of the drilled countersink 98 and the shift lever 104 moved laterally until the detent 110 drops into the drilled countersink 98 opposite and offset from the first drilled countersink 98.

The reverse positions are reached from the first speed position "1" by longitudinally moving the shift lever 104 towards the first reverse position, "1R". Again this causes a further upward movement of the speed change mechanism connection 156 to put the transmission into "low speed reverse". A lateral shift towards the second reverse position "2R" causes the high/low actuator bar 136 to abut the upright 146 and cause the transmission to shift into reverse "high".

Similarly, from the first speed position "1", the third and fourth speed positions "3" and "4" are reached by respectively passing the shift lever 104 through the shift pattern cutout 22 laterally to the second speed position "2" and then longitudinally to the third speed position "3" and then laterally to the fourth speed position "4", respectively. It is to be noted that the shift pattern cutout 22 has a laterally inclined portion in a longitudinal direction between the second and third positions "2" and "3" so as to cause the high/low lever 138 to be shifted from its "high" position to its "low" position in being shifted from second to third speed.

Due to the configuration of the shift pattern cutout 22, it is to be noted that the shift lever 104 and the speed shift quadrant 72 must be returned to the neutral transmission position in line with the neutral cutout 58 before the shift lever 104 can be disengaged from the shift lever slot 160. This prevents any changes from being made in the transmission while the speed shift quadrant 72 indicates that the transmission should be in a speed position other than neutral.

To shift ranges, the shift lever 104 is moved laterally through the neutral cutout 58 and then longitudinally along the vertical lateral plane until it is in a position to be moved laterally into engagement with the shift lever slot 84 in the range shift quadrant 64. When the shift lever 104 is moved into the neutral cutout 58, the speed latch 116 engages the holding slot 154 to lock the speed shift quadrant 72 in place and when the shift lever 104 is engaged with the shift lever slot 84, the range latch 114 is disengaged from the holding slot 78.

A shift from the "A" range to the "B" range involves a straight longitudinal movement of the shift lever 104 until it abuts the range stop "B". While some lateral movement of the shift lever 104 is possible, it is not possible to completely disengage the shift lever 104 from the range shift quadrant 64 between ranges because the range shift latch would then abut the range shift quadrant 64 between the slots 75 through 78 rather than engaging one of them.

When the shift lever 104 is moved into engagement with the shift lever slot 84 in the shift range quadrant 64, a snap into place of the shift lever 104 will be felt as the detents 118 and 120 in the shift lever mechanism 66 ride down the ramps 96 from the speed flat 94 to the range flat 92. Conversely, when the shift lever 104 is disengaged, some effort will be required to move the detents 118 and 120 up the ramps 96 so as to provide a positive indication of a withdrawal of the shift lever 104 from the range shift quadrant 64.

To shift from the "B" range to the "C" range or from the "C" range to the "D" range it is necessary for the shift lever 104 to be moved slightly laterally to clear the range stop provided by the shift pattern cutout 22 and then to be moved longitudinally forward until again stopped by the shift pattern cutout 22. Thus it will be noted that the shift lever 104 must be moved in a double Z pattern when shifting from the range stop "B" to the range stop "D".

Since it is desirable to maintain the Z pattern for downshifting also so that an operator will always be aware of passing into a given range position, the range stop bracket 130 and the range stop finger 34 are provided.

When downshifting from the range "D", the shift lever 104 is movable longitudinally until it is in line with the range stop "C" at which point the finger 132 will abut the range stop finger 34 and require a lateral movement into the range stop "C" in order to allow a further downshift. Similarly, when downshifting from the "C" range to the "B" range, the finger 134 will abut the range stop finger 34 to require a lateral shift of the shift lever 104 to allow the fingers to clear.

Since the various ranges provide successively higher speeds and it is desirable to prevent operation of the tractor in reverse in some of the highest of these speeds, an automatic provision in the form of the reverse lockout mechanism 48 has been provided to prevent high speed reverse operation. In the preferred embodiment, reverse is possible only in the "A," "B," or "C" ranges. When the shift lever 104 is moved to the range stop "D", the pin 50 sliding in the reverse lockout cam groove 86 causes the pin 50 to move laterally in the lateral slot 56 to a position where it will be in line with the reverse lockout notch 158. The speed shift quadrant 72 will thus be able to be pivoted to all positions except those for reverse at which time the reverse lockout notch 158 will abut the pin 52 and prevent any further movement thereof. As obvious to those skilled in the art, a change to the reverse lockout cam groove 86 can make it operable to lock out other speed positions in other ranges as desired.

As would be obvious to those skilled in the art, a mechanism substantially identical to the reverse lockout mechanism 48 could be used to lockout higher speeds at other ranges. In some European countries, this type of mechanism is used to automatically lock out the third and fourth speeds in the range "D".

In Europe, where it is desired to limit the maximum speed at which the tractor can be operated, the speed limiting lockout device 170 is added to the shift control 10. When the range shift quadrant 64 is moved into the "D" range, an edge of the high/low lockout face 82 of the range shift quadrant 64 abuts the bolt 176 and causes the actuator pin 180 to move in the stepped slot 182 to cause rotation of the lockout arm 184 around the stud 172 so as to cause the lockout surface 186 to block the shift pattern cutout 22 at the fourth speed position "4". When an attempt is made to move the shift lever 104 laterally, the loads applied to the lockout surface 186 are directed laterally into the actuator pin 180 with no component which would allow the pivot bracket 174 to pivot the actuator pin 180 from its position in the step in the stepped slot 182. The actuator pin 180 will only move when the range shift quadrant 68 is moved from "D" range and the spring 178 causes the pivot bracket 174 to pivot.

When the vehicle is stopped and it is desired to place the transmission in park, the shift lever 104 is again moved into the vertical longitudinally extending plane and then pivoted longitudinally until it abuts the park cutout 60 at which time the parking spring 62 will urge the shift lever 104 laterally into the park position "P". The park lockup bracket 148 will remain in contact with the park arm 38 throughout its entire lateral movement. In this position, the shift lever 104 engages the park lockup notch 162 so as to prevent the speed shift quadrant 72 from being moved from its neutral position. Further, as shown in FIG. 5, the park lockup bracket 148 will abut the park arm 38 causing it to pivot and lift the park lockup connection 44 so as to lock up the transmission. While a complex park lockup mechanism has been shown with a four bar linkage, it is to be understood and will be obvious that this was done strictly to meet force requirements and would not be normally necessary if lower force requirements occur with other transmissions.

While the invention has been described in conjunction with a specific embodiment, it is to be understood that many alternatives, modifications, and variations will be apparent to those skilled in the art in light of the foregoing description. Accordingly, it is intended to embrace all such alternatives, modifications, and variations which fall within the spirit and scope of the appended claims.

I claim:

1. A shift control for a hydromechanical transmission comprising: support means having primary pivot means provided therein; range shift means pivotally mounted on said primary pivot means and connectible to a range change mechanism to shift said hydromechanical transmission between ranges upon pivotation of said range shift means, said range shift means having hold and shift means provided therein; speed shift means pivotally mounted on said primary pivot means and spaced apart from said range shift means, said speed shift means connectible to a speed change mechanism to shift said hydromechanical transmission between speeds upon pivotation of said speed shift means, said speed shift means having hold and shift means provided therein; main pivot means pivotally mounted on said primary pivot means and having secondary pivot means provided therein perpendicular to said primary pivot means; shift lever means carrying a shift lever and disposed between said range and speed shift means, said shift lever means pivotally mounted on said secondary pivot means of said main pivot means for pivotation around said secondary pivot means to engage and disengage said shift means of said range and speed shift means and around said primary pivot means to selectively move or not move said range and speed shift means, said shift lever means including range engagement means cooperating with said support means to engage said hold means in said range shift means to hold said range shift means in a fixed pivoted position when said shift lever means is out of engagement with said shift means of said range shift means, said shift lever means including speed engagement means cooperating with said support means to engage said hold means in said speed shift means to hold said speed shift means in a fixed pivoted position when said shift lever means is out of engagement with said shift means of said speed shift means whereby said speed shift means is held when said range shift means is shifted, said range shift means is held when said speed shift means is shifted, and both are held when said shift lever means is not is a position to shift either.

2. The shift control as claimed in claim 1 wherein said speed shift means has a pivoted neutral position in which said speed change mechanism shifts said hydromechanical transmission to a neutral configuration, and including guide means carried by said support means and having shift pattern means provided therein requiring said speed change means to be in the pivoted neutral position before said range change means can be shifted.

3. The shift control as claimed in claim 1 including guide means carried by said support means and having shift pattern means provided therein defining the movement of said shift lever means, said shift pattern means having stop means provided therein defining a plurality of range indicative stop positions when said shift lever means is pivoted in a first direction of pivotation, and wherein said shift lever means includes range stop means cooperating with said support means to define said plurality of range indicative stop positions when said shift lever means is pivoted in a second direction.

4. The shift control as claimed in claim 3 wherein said shift lever means includes detent means and said main pivot means includes range detent engagement means cooperative with said detent means to define said pivoted position when said shift lever means is engaged or disengaged from said shift means in said range shift means.

5. The shift control as claimed in claim 1 including high/low shift means pivotally mounted on said support means and connectible to high/low hydraulic valving to shift said hydromechanical transmission between speeds upon pivotation of said high/low shift means and wherein said shift lever means includes actuation means engageable with said high/low shift means to cause pivotation thereof when said shift lever means is pivoted around said second pivot means and engages said shift means in said speed shift means.

6. The shift control as claimed in claim 5 wherein said shift lever means includes detent means and said main pivot means has detent engagement means provided therein cooperative with said detent means to define high and low positions of said shift lever indicative of said high and low positions of said high/low shift means.

7. The shift control as claimed in claim 1 including park lockup means pivotally mounted on said support means and connectible to a park mechanism for selectively locking up or unlocking said hydromechanical transmission upon pivotation of said park lockup means, and wherein said shift lever means includes park engagement means for causing pivotation of said park lockup means to lockup said hydromechanical transmission in a pivoted park position of said shift lever means.

8. The shift control as claimed in claim 7 wherein said speed shift means has shift lockup means provided therein, and including guide means carried by said support means and having shift pattern means provided therein defining said pivoted park position and including means for biasing said shift lever means into engagement with said shift lockup means when said shift lever means is in said pivoted park position to lockup said speed shift means relative to said guide means.

9. The shift control as claimed in claim 1 including guide means carried by said support means and having shift pattern means provided therein defining pivoted positions of said range and speed shift means, and speed lockout means carried by said guide means in engagement with said range shift means and engageable with said speed shift means to limit pivotation thereof at predetermined pivoted positions of said range shift means.

10. The shift control as claimed in claim 1 including high/low shift means pivotally mounted on said support means and connectible to high/low hydraulic valving to shift said hydromechanical transmission between speeds upon pivotation of said high/low shift means, and wherein said shift lever means includes activation means engageable with said high/low shift means to cause pivotation thereof when said shift lever means engages said shift means in said speed shift means and is pivoted around said second pivot means, and including high/low limiting means carried by said support means for blocking pivotation of said shift lever means around said second pivot means at predetermined pivoted positions of said range shift means.

11. A shift control for a hydromechanical transmission comprising: a longitudinally and vertically extending support member having a laterally extending main pivot pin provided therein; a range shift quadrant pivotally mounted on said primary pivot pin and connectible to a range change mechanism to shift said hydromechanical transmission between ranges upon pivotation of said range shift quadrant, said range shift quadrant having hold means provided therein and a lever slot provided therein at the top thereof; a speed shift quadrant pivotally mounted on said primary pivot pin spaced apart from said range shift quadrant and connectible to a speed change mechanism to shift said hydromechanical transmission between speeds upon pivotation of said speed shift quadrant, said speed shift quadrant having hold means provided therein and a lever slot provided therein at the top thereof; a main pivot member pivotally mounted around said primary pivot pin for pivotation in a vertical-longitudinal plane between said range and speed shift quadrants, said main pivot member having a longitudinally extending secondary pivot bore provided therein; a shift lever mechanism disposed around said main pivot member and including a secondary pivot pin pivotally engaging said secondary pivot bore in said main pivot member whereby said shift lever mechanism is pivotable in a vertical-longitudinal plane around said primary pivot pin and in a generally vertical-lateral plane around said secondary pivot pin, said shift lever mechanism including an integral shift lever pivotable therewith from a neutral position out of engagement with said range or speed shift quadrant around said secondary pivot pin to engage said lever slot in said range or said speed shift quadrant and pivotable therewith around said primary pivot pin when engaged with said range or said speed shift quadrant to cause respective pivotation thereof, said shift lever mechanism including range and speed engagement means pivotally secured to said support member respectively proximate said range or said speed shift quadrants for engaging said hold means in said respective range or speed shift quadrant when said shift lever is out of engagement with said lever slot in said respective range or speed shift quadrant; and a guide plate secured to said support member over said range and speed shift quadrants and having a shift pattern cutout provided therein encircling said shift lever and defining a plurality of pivoted positions thereof.

12. The shift control as claimed in claim 11 wherein said speed shift quadrant has a pivoted neutral position in which said speed change mechanism shifts said hydromechanical transmission to a neutral configuration and said shift pattern cutout in said guide plate includes a single neutral cutout at which said shift lever can be engaged with and disengaged from said lever slot in said speed shift quadrant and said speed latch can be respectively disengaged from and engaged with said hold slot in said speed shift quadrant.

13. The shift control as claimed in claim 11 wherein said shift pattern cutout in said guide plate includes a plurality of range stop cutouts whereat said shift lever must be pivoted laterally in a first direction while being pivoted longitudinally in a first direction to shift ranges, said support member includes a range stop finger, and said shift lever mechanism includes a range stop bracket having a plurality of fingers abuttable with said range stop finger whereat said shift lever must be pivoted laterally in a second direction while being pivoted longitudinally in a second direction to shift ranges whereby said shift lever moves in a Z pattern in shifting said hydromechanical transmission from one range to another.

14. The shift control as claimed in claim 13 wherein said main pivot member has a configured surface provided thereon, and said shift lever mechanism includes a detent device engaging said configured surface to define said pivoted position where said shift lever is engaged or disengaged from said lever slot in said range shift quadrant.

15. The shift control as claimed in claim 11 including a high/low lever pivotally mounted on said support member and connectible to high/low hydraulic valving to shift said hydromechanical transmission between speeds upon pivotation of said high/low lever, and wherein said high/low lever mechanism includes an arcuate actuation member abutting said high/low lever to normally prevent pivotation thereof and to cause pivotation thereof when said shift lever mechanism is piovted around said secondary pivot pin to engage said shift lever in said lever slot in said speed shift quadrant.

16. The shift control as claimed in claim 15 wherein said main pivot member has oppositely disposed flats provided thereon having oppositely drilled countersinks provided therein and said shift lever mechanism includes a pair of oppositely disposed detent devices provided therein successively interactive with said offset countersinks upon lateral pivotation of said shift lever when engaging said speed shift quadrant to define high and low positions of said shift lever indicative of said high and low positions of said high/low lever.

17. The shift control as claimed in claim 11 including a park lockup arm pivotally mounted on said support member and connectible to a park mechanism for selectively locking up or unlocking said hydromechanical transmission upon pivotation of said park lockup arm and wherein said shift lever mechanism includes a park engagement member engageable with said park lockup arm to cause pivotation and holding thereof upon pivotation of said shift lever to a fully pivoted park position as established by said shift pattern cutout in said guide plate.

18. The shift control as claimed in claim 17 wherein said shift pattern cutout includes a laterally extending park cutout, said guide plate includes biasing means for urging said shift lever in said park cutout laterally toward said speed shift quadrant, and said speed shift quadrant has a park lock slot provided therein engageable with said shift lever disposed laterally in said park cutout when said speed shift quadrant is in the pivoted neutral position to prevent movement of said speed shift quadrant.

19. The shift control as claimed in claim 11 wherein said range shift quadrant has a longitudinally extending cam groove provided therein, said speed shift quadrant has a lockout notch provided therein, and including a laterally movable pin bracket carried by said guide plate extending into said cam groove and extending proximate said lockout notch, said pin bracket laterally movable by said cam groove to engage and disengage from said lockout notch to respectively limit and allow pivotation of said speed shift quadrant.

20. The shift control as claimed in claim 11 including a high/low lever pivotally mounted on said support member and connectible to high/low hydraulic valving to shift said hydromechanical transmission between speeds upon pivotation of said high/low lever, wherein said shift lever mechanism includes an arcuate activation member abutting said high/low lever to normally prevent pivotation thereof and to cause pivotation thereof when said shift lever mechanism is pivoted around said secondary pivot pin to engage said shift lever in said lever slot in said speed quadrant, and including a first pivotable member pivotable in said vertical-longitudinal plane upon engagement with said range shift quadrant and a second pivotable member pivotable in a horizontal plane in response to pivotation of said first pivotable member to cover a portion of said shift pattern cutout and block pivotation of said shift lever around said secondary pivot pin.

21. A shift control for a hydromechanical transmission comprising: a longitudinally and vertically extending support member having a laterally extending main pivot pin provided therein; a range shift quadrant pivotally mounted on said primary pivot pin and connectible to a range change mechanism to shift said hydromechanical transmission between ranges upon pivotation of said range shift quadrant, said range shift quadrant having a plurality of laterally extending holding slots provided therein at the bottom thereof and a laterally extending lever slot provided therein at the top thereof; a speed shift quadrant pivotally mounted on said primary pivot pin and connectible to a speed change mechanism to shift said hydromechanical transmission between speeds upon pivotation of said speed shift quadrant, said speed shift quadrant having a laterally extending holding slot provided therein at the bottom thereof and a laterally extending lever slot provided therein at the top thereof; a main pivot member pivotally mounted on said range and speed shift quadrants for pivotation in a vertical-longitudinal plane therebetween, said main pivot member having a longitudinally extending secondary pivot bore provided therein; a shift lever mechanism disposed around said main pivot member and including a secondary pivot pin pivotally engaging said secondary pivot bore in said main pilot member whereby said shift lever mechanism is pivotal in a vertical-longitudinal plane around said primary pivot pin and in a vertical-lateral plane around said secondary pivot pin, said shift lever mechanism having an integral shift lever extending therefrom pivotal therewith around said secondary pivot pin to engage said lever slot in said range or said speed shift quadrant and pivotal therewith around said primary pivot pin when engaged with said range or said speed shift quadrant to cause respective pivotation thereof, said shift lever mechanism including laterally disposed range and speed shift quadrant proximate arcuate members and range and speed latches pivotally fixed to said support member engaging said respective arcuate members to be pivoted thereby to normally engage said holding slots in said range and speed shift quadrants and to disengage respectively therefrom when said shift lever respectively engages said lever slots in said range and speed shift quadrants; and a guide plate secured to said support member over said range and speed shift quadrants and having a shift pattern cutout provided therein encircling said shift lever and defining a plurality of pivoted positions thereof.

22. The shift control as claimed in claim 21 wherein said speed shift quadrant has a pivoted neutral position in which said speed change mechanism shifts said hydromechanical transmission to a neutral configuration and said shift pattern cutout in said guide plate includes a laterally extending neutral cutout at which said shift lever can be engaged with and disengaged from said lever slot in said speed shift quadrant and said speed latch can be respectively disengaged from and engaged with said hold slot in said speed quadrant and includes a longitudinally extending neutral cutout along which said shift lever can be pivoted around said primary pivot pin without causing pivotation of either said range or speed shift quadrant.

23. The shift control as claimed in claim 21 wherein said shift pattern cutout in said guide plate includes a plurality of laterally extending range stop cutouts whereat said shift lever must be pivoted laterally towards said speed shift quadrant while being pivoted longitudinally in a first direction to shift ranges, said support member has a range stop finger extending vertically upward therefrom proximate the bottom of said shift lever mechanism, and said shift lever mechanism includes a range stop bracket depending therefrom having a plurality of fingers abuttable with said range stop bracket when said shift lever is being pivoted longitudinally in a direction opposite the first direction, to require said shift lever to be pivoted laterally away from said range shift quadrant shifting said hydromechanical transmission from one range to another.

24. The shift control as claimed in claim 23 wherein said main pivot member has a pair of offset parallel surfaces provided thereon connected by a ramp, and said shift lever mechanism includes a detent device movable across said ramp to define said pivoted positions around said secondary pivot pin wherein said shift lever is engaged or disengaged from said lever slot in said range shift quadrant.

25. The shift control as claimed in claim 21 including a high/low lever pivotally mounted on said support member and connectible to high/low hydraulic valving to shift said hydromechanical transmission between speeds upon pivotation of said high/low lever, and wherein said high/low lever mechanism includes an arcuate actuation member abutting said high/low lever to normally prevent pivotation thereof and to cause pivotation thereof when said shift lever mechanism is pivoted around said secondary pivot pin to engage said shift lever in said lever slot in said speed shift quadrant.

26. The shift control as claimed in claim 25 wherein said main pivot member has oppositely disposed flats provided thereon having oppositely drilled offset countersinks provided therein and said shift lever mechanism includes a pair of oppositely disposed detent devices provided therein successively interacted with said offset countersink upon lateral pivotation of said shift lever when engaging said speed shift quadrant to define high and low positions of said shift lever indicative to said high and low positions of said high/low lever.

27. The shift control as claimed in claim 21 including a park lockup arm pivotally mounted on said support member and connectible to a park mechanism for selectively locking up or unlocking said hydromechanical transmission upon pivotation of said park lockup arm and wherein said shift lever mechanism includes a park engagement member engageable with said park lockup arm to cause pivotation and holding thereof upon pivotation of said shift lever to a fully pivoted park position as established by said shift pattern cutout in said guide plate.

28. The shift control as claimed in claim 27 wherein said shift pattern cutout includes a laterally extending park cutout, said guide plate includes biasing means for urging said shift lever in said park cutout laterally toward said speed shift quadrant, and said speed shift quadrant has a park lock slot provided therein engageable with said shift lever disposed laterally in said park cutout when said speed shift quadrant is in the pivoted neutral position to prevent movement of said speed shift quadrant.

29. The shift control as claimed in claim 21 wherein said range shift quadrant has a longitudinally extending cam groove provided therein, said speed shift quadrant has a lockout notch provided therein, and including a laterally movable pin bracket carried by said guide plate extending into said cam groove and extending proximate said lockout notch, said pin bracket laterally movable by said cam groove to engage and disengage from said lockout notch to respectively limit and allow pivotation of said speed shift quadrant.

30. The shift control as claimed in claim 21 including a high/low lever pivotally mounted on said support member and connectible to high/low hydraulic valving to shift said hydromechanical transmission between speeds upon pivotation of said high/low lever, wherein said shift lever mechanism includes an arcuate activation member abutting said high/low lever to normally prevent pivotation thereof and to cause pivotation thereof when said shift lever mechanism is pivoted around said secondary pivot pin to engage said shift lever in said lever slot in said speed quadrant, and including a first pivotable member pivotable in said vertical-longitudinal plane upon engagement with said range shift quadrant and a second pivotable member pivotable in a horizontal plane in response to pivotation of said first pivotable member to cover a portion of said shift pattern cutout and block pivotation of said shift lever around said secondary pivot pin.

* * * * *